United States Patent
Morello et al.

(10) Patent No.: US 12,536,276 B1
(45) Date of Patent: Jan. 27, 2026

(54) TECHNIQUES FOR SECURING SOFTWARE COMPONENTS THROUGH SECURITY PACKAGES DEFINED IN SOFTWARE IMAGE RECIPES

(71) Applicant: MINIMUS LTD, Tel Aviv (IL)

(72) Inventors: John Morello, Baton Rouge, LA (US); Ben Bernstein, New York, NY (US); Dima Stopel, Herzliya (IL)

(73) Assignee: MINIMUS LTD, Tel Aviv (IL)

( * ) Notice: Subject to any disclaimer, the term of this patent is extended or adjusted under 35 U.S.C. 154(b) by 0 days.

(21) Appl. No.: 19/233,602

(22) Filed: Jun. 10, 2025

(51) Int. Cl.
G06F 21/54 (2013.01)
G06F 21/62 (2013.01)

(52) U.S. Cl.
CPC .............. *G06F 21/54* (2013.01); *G06F 21/62* (2013.01); *G06F 2221/033* (2013.01)

(58) Field of Classification Search
CPC .... G06F 21/54; G06F 21/62; G06F 2221/033; G06F 21/577; G06F 8/60; G06F 8/41; G06F 21/50; G06F 8/30; G06F 8/36; H04L 63/1433
See application file for complete search history.

(56) References Cited

U.S. PATENT DOCUMENTS

| | | |
|---|---|---|
| 9,959,104 B2 | 5/2018 | Chen et al. |
| 9,983,891 B1 | 5/2018 | Christensen |
| 10,505,830 B2 | 12/2019 | Mishalov et al. |
| 10,885,378 B2 | 1/2021 | Li et al. |
| 11,062,022 B1 | 7/2021 | Kalamkar et al. |
| 11,182,140 B2 | 11/2021 | Riek et al. |
| 11,599,348 B2 | 3/2023 | Goldmann et al. |
| 11,669,362 B2 | 6/2023 | Singh et al. |
| 11,972,333 B1 | 4/2024 | Horesh et al. |
| 12,095,806 B1 | 9/2024 | Nemtsov et al. |
| 12,099,414 B2 | 9/2024 | Mitkar et al. |

(Continued)

FOREIGN PATENT DOCUMENTS

CN 111522628 A 8/2020

OTHER PUBLICATIONS

"Announcing 'Yum + RPM for Containerized Applications'—Nulecule & Atomic App," Red Hat Blog (Jun. 23, 2015) (available at https://www.redhat.com/en/blog/announcing-yum-rpm-containerized-applications-nulecule-atomic-app) (last accessed Nov. 7, 2024, at 4:27 PM Eastern time).

(Continued)

*Primary Examiner* — Wasika Nipa
*Assistant Examiner* — Edgar W Xie
(74) *Attorney, Agent, or Firm* — M&B IP Analysts, LLC

(57) ABSTRACT

A system and method for software image management. A method includes generating a plurality of software packages including a plurality of units of code, wherein each software package is generated using a respective unit of code of the plurality of units of code, wherein the plurality of software packages includes a security package, wherein the respective unit of code for the security package configures a processing circuitry to perform at least one cybersecurity function when executed by the processing circuitry; and building a software image based on the plurality of software packages by executing a set of instructions of a file, wherein the set of instructions causes the plurality of software packages to be combined in order to build the software image when executed.

15 Claims, 8 Drawing Sheets

(56) References Cited

U.S. PATENT DOCUMENTS

| | | | |
|---|---|---|---|
| 12,242,994 B1* | 3/2025 | Aggarwal | G06Q 10/0633 |
| 12,267,345 B1 | 4/2025 | Erlingsson et al. | |
| 2011/0225574 A1 | 9/2011 | Khalidi et al. | |
| 2012/0110333 A1 | 5/2012 | Lukkarila et al. | |
| 2012/0324446 A1 | 12/2012 | Fries et al. | |
| 2015/0365437 A1 | 12/2015 | Bell, Jr. et al. | |
| 2017/0147813 A1 | 5/2017 | McPherson et al. | |
| 2019/0347127 A1 | 11/2019 | Coady et al. | |
| 2020/0159536 A1 | 5/2020 | Saidi | |
| 2020/0213357 A1* | 7/2020 | Levin | H04L 63/20 |
| 2020/0285504 A1 | 9/2020 | Siegmund | |
| 2020/0326931 A1 | 10/2020 | Nadgowda et al. | |
| 2021/0157623 A1 | 5/2021 | Chandrashekar et al. | |
| 2021/0208916 A1 | 7/2021 | Wang et al. | |
| 2021/0255840 A1 | 8/2021 | Novy | |
| 2021/0319109 A1 | 10/2021 | Weng et al. | |
| 2022/0147378 A1 | 5/2022 | Tarasov et al. | |
| 2022/0166626 A1 | 5/2022 | Madisetti et al. | |
| 2023/0168986 A1 | 6/2023 | Larkin et al. | |
| 2024/0069883 A1* | 2/2024 | Griffin | G06F 9/44505 |
| 2024/0103833 A1 | 3/2024 | Shemer et al. | |
| 2024/0134967 A1 | 4/2024 | Yaron et al. | |
| 2024/0411674 A1 | 12/2024 | Zmigrod et al. | |
| 2025/0004741 A1 | 1/2025 | Hubik | |
| 2025/0123819 A1 | 4/2025 | Khemka et al. | |
| 2025/0156535 A1 | 5/2025 | Keller et al. | |

OTHER PUBLICATIONS

Ian Gorton et al.; Components in the Pipeline; IEEE; pp. 34-40; retrieved on Jul. 18, 2025 (Year: 2025).

* cited by examiner

TECHNIQUES FOR SECURING SOFTWARE COMPONENTS THROUGH SECURITY PACKAGES DEFINED IN SOFTWARE IMAGE RECIPES

TECHNICAL FIELD

The present disclosure relates generally to software image management, and more specifically to securing software components using security packages.

BACKGROUND

Software images are files containing code and other resources used to realize one or more software components. Example software images include software container images used to realize software containers, as well as virtual machine (VM) images used to realize virtual machines. Executing the code within a software image causes a software component such as a container or virtual machine to be deployed within a computing environment.

Updates in code included in software images may result in changes to how the corresponding software component behaves. Code may be updated, for example, to improve software performance or to patch out vulnerabilities. For example, when a vulnerability in code may expose the software component to cybersecurity threats, the code of the software component used to realize that software component may be updated in order to patch out the vulnerability. As a result, maintaining software images can serve to maintain performance and/or security within a computing environment.

Solutions which aid in maintaining software images would therefore be desirable.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for software image management. The method comprises: generating a plurality of software packages including a plurality of units of code, wherein each software package is generated using a respective unit of code of the plurality of units of code, wherein the plurality of software packages includes a security package, wherein the respective unit of code for the security package configures a processing circuitry to perform at least one cybersecurity function when executed by the processing circuitry; and building a software image based on the plurality of software packages by executing a set of instructions of a file, wherein the set of instructions causes the plurality of software packages to be combined in order to build the software image when executed.

Certain embodiments disclosed herein also include a non-transitory computer-readable medium having stored thereon causing a processing circuitry to execute a process, the process comprising: generating a plurality of software packages including a plurality of units of code, wherein each software package is generated using a respective unit of code of the plurality of units of code, wherein the plurality of software packages includes a security package, wherein the respective unit of code for the security package configures a processing circuitry to perform at least one cybersecurity function when executed by the processing circuitry; and building a software image based on the plurality of software packages by executing a set of instructions of a file, wherein the set of instructions causes the plurality of software packages to be combined in order to build the software image when executed.

Certain embodiments disclosed herein also include a system for software image management. The system comprises: a processing circuitry; and a memory, the memory containing instructions that, when executed by the processing circuitry, configure the system to: generate a plurality of software packages including a plurality of units of code, wherein each software package is generated using a respective unit of code of the plurality of units of code, wherein the plurality of software packages includes a security package, wherein the respective unit of code for the security package configures a processing circuitry to perform at least one cybersecurity function when executed by the processing circuitry; and build a software image based on the plurality of software packages by executing a set of instructions of a file, wherein the set of instructions causes the plurality of software packages to be combined in order to build the software image when executed.

Certain embodiments disclosed herein include a method, non-transitory computer-readable medium, or system as noted above or below, further including or being configured to perform the following step or steps: rebuilding the software image using an updated version of at least one unit of code of the plurality of units of code.

Certain embodiments disclosed herein include a method, non-transitory computer-readable medium, or system as noted above or below, further including or being configured to perform the following step or steps: monitoring for changes to the plurality of units of code; identifying an update based on the monitoring, wherein the update includes a change in the at least one unit of code, wherein the updated version of the at least one unit of code is based on the update.

Certain embodiments disclosed herein include a method, non-transitory computer-readable medium, or system as noted above or below, further including or being configured to perform the following step or steps: identifying a type of cybersecurity threat with respect to the software image, wherein the updated version of the at least one unit of code used to rebuild the software image is secured against the type of cybersecurity threat.

Certain embodiments disclosed herein include a method, non-transitory computer-readable medium, or system as noted above or below, wherein the software image is executed to deploy a software component in a computing environment, wherein the security package is a first security package, further including or being configured to perform the following step or steps: ingesting cybersecurity data from the computing environment in which the software component is deployed; identifying a cybersecurity threat based on the ingested cybersecurity data; and rebuilding the software image, wherein rebuilding the software image includes adding a second security package, wherein the second security package is designed to secure the software image against the cybersecurity threat.

Certain embodiments disclosed herein include a method, non-transitory computer-readable medium, or system as noted above or below, wherein the cybersecurity threat is identified with respect to at least one threat vector, wherein the second security package is further designed to secure the software image against the at least one threat vector.

Certain embodiments disclosed herein include a method, non-transitory computer-readable medium, or system as noted above or below, further including or being configured to perform the following step or steps: generating the file using a generative artificial intelligence (genAI) model by prompting the genAI model using a prompt including text identifying the plurality of packages.

Certain embodiments disclosed herein include a method, non-transitory computer-readable medium, or system as noted above or below, further including or being configured to perform the following step or steps: providing the genAI model access to at least one tool by prompting the genAI model using a prompt including text describing how to use the at least one tool, wherein the genAI model access the at least one tool in order to obtain the plurality of units of code.

Certain embodiments disclosed herein include a method, non-transitory computer-readable medium, or system as noted above or below, further including or being configured to perform the following step or steps: executing the software image in order to cause deployment of a software component in a computing environment.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
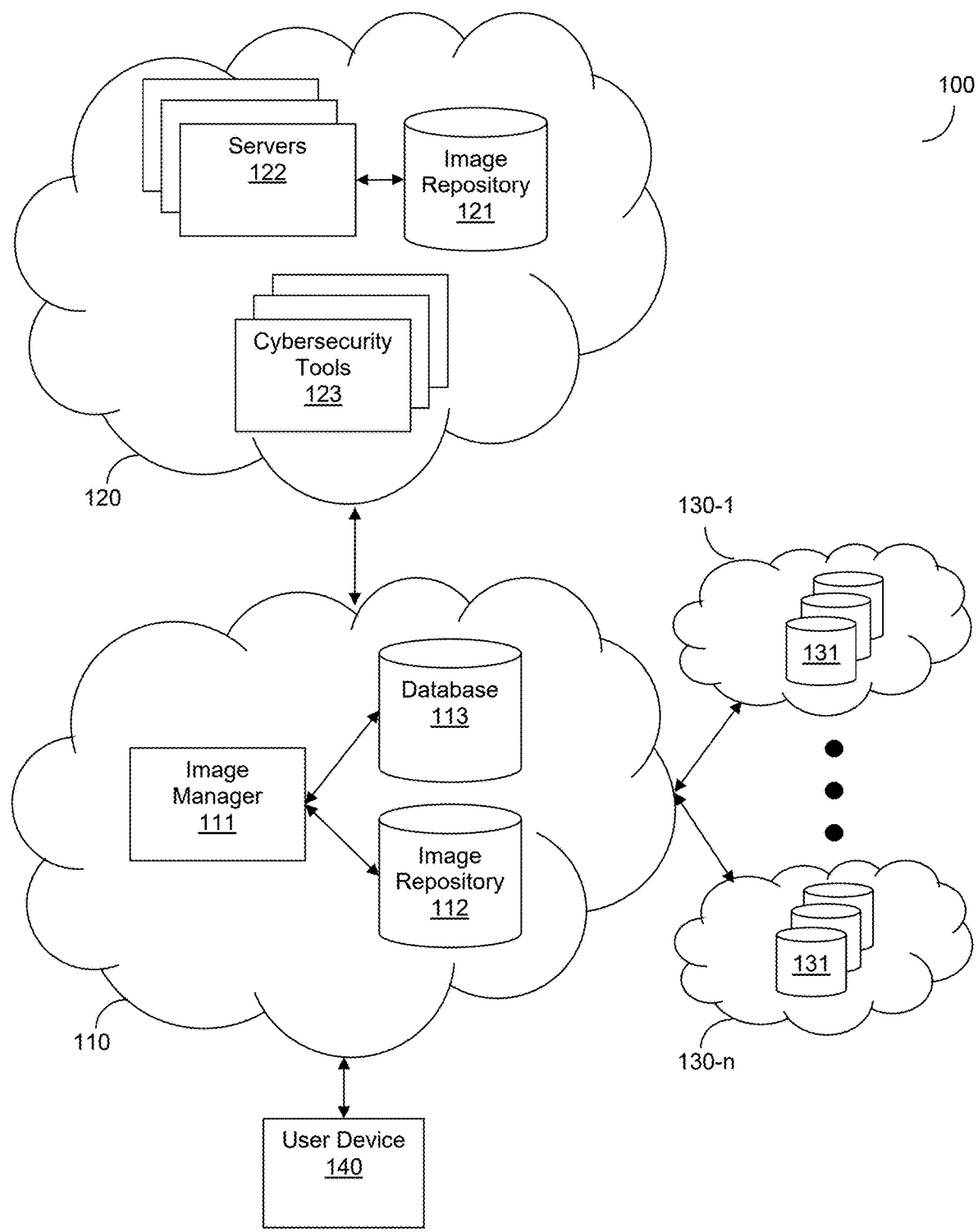
FIG. 1 is a network diagram utilized to describe various disclosed embodiments.

The various disclosed embodiments include techniques for securing software containers and other software components through security packages defined in software image recipes. More specifically, the disclosed embodiments utilize software image recipes which include sets of instructions defining corresponding software images with respect to combinations of software packages including one or more security packages. Each security package, in turn, may define one or more cybersecurity functions (also referred to as security functions) to be performed when the software image is executed in order to protect the resulting software component (for example, a software container) realized by executing the software image. To this end, each security package may include code that, when executed, perform the one or more security functions.

Providing software image recipes defined with respect to a set of software packages including security packages therefore allows for building software containers or other software components defined via software images created using the software image recipes that have built in security functionality which may therefore be utilized to secure the resulting software components when their corresponding software images are deployed. That is, the software recipes may be used to build software images of software components that run security functions as part of their basic operation. This allows for securing the resulting software components regardless of their deployment.

To this end, it has been identified that some solutions for securing deployed software components include deploying security programs or other security tools within or otherwise with respect to computing environments where software components are deployed. These security tools may be realized using external services or agents communicating with a given security environment or otherwise using code deployed within the computing environment. As a non-limiting example, a web application firewall (WAF) may be deployed with respect to a computing environment in which a software container is deployed in order to secure the software container against certain cybersecurity threats. It has been further identified that these solutions may fail to properly secure software components when the software components are deployed elsewhere or if these security tools fail (for example, due to incorrect configuration or code execution failure). In such circumstances, the software components may be left defenseless or otherwise inadequately protected against at least some kinds of cybersecurity threats.

By defining software image recipes using security packages as described herein, the software images may be built with security functions embedded therein. Consequently, these security functions may be executed when running the software images in order to effectively allow the resulting software components to defend themselves from at least some kinds of threats. Accordingly, the software components may be deployed in environments lacking security tools or lacking certain kinds of security tools while still securing the software components against at least some kinds of cybersecurity threats. That is, software images created using recipes including security packages as described herein can be inherently secured against a given kind of threat such that they may be deployed in computing environments which lack security measures against threats of that kind while maintaining at least some degree of protection against those kinds of threats.

Each security package may include functions used for defending against a single kind of threat or portion thereof (for example, a threat vector). That is, each security function may be used to secure a resulting software component against threats of that kind. Recipes may define a software image with respect to one or more security packages such that the resulting software component is protected against one or more respective kinds of threats. In this regard, the security packages may act as discrete units which may be flexibly combined in order to protect against different combinations of threats. In a further embodiment, each security package corresponds to exactly one type of cybersecurity threat such that each security package is a discrete unit of code designed to protect against only a corresponding type of cybersecurity threat.

Defining security packages as discrete units which only protect against certain types of threats or threat vectors may allow, for example, designing software image recipes which include the minimal amount of security packages (and, consequently, minimize the amount of code included in software images built using these recipes) needed for a given use case (for example, deployment in a given computing environment or protection against a given kind of threat), or otherwise reduce the total amount of code (and, consequently, data) included in resulting software images built using the software image recipes. Consequently, using discrete security packages with functions only for defending against corresponding threats may allow for reducing the memory used to store software image recipes, the size of software images built using recipes as described herein, and the amount of processing and memory needed to execute software images built using recipes as described herein. This may allow for designing more lightweight software containers or other software components while still building in some security functionality, which can avoid bloat of accumulating security functions over time by simply adding code as more threats are identified.

Likewise, defining security packages as discrete units designed only to protect against certain types of threats or threat vectors may allow for faster rebuilding of software images when a vulnerability is discovered or otherwise when a software image is identified as a target of a potential cyber threat. That is, in at least some embodiments, when a cyber threat is detected and it is determined that a software image is a target of the cyber threat, the software image may be rebuilt using its corresponding software image recipe. The act of rebuilding the software image may include retrieving current versions of the code defined in the packages, thereby updating the code of the software image. This updated code may patch vulnerabilities or otherwise further secure the software image against potential cyber threats. In at least some situations, new versions of code of the security packages may effectively result in updating the security features used by the software image, for example in order to update the security features with functionality which has been redesigned to better defend against the cyber threat.

Accordingly, rebuilding software images when cyber threats are detected may allow for further securing the software images against potential cyber threats, and including security packages among the software image recipes for those software images effectively allows for updating security features of the software images to the most current versions as threats are detected. This may allow for maintaining security for the software components realized by executing these software images while reducing the amount of updating needed to keep security features current.

Additionally, as noted above, in embodiments where the security packages are discrete units of code designed only for securing against certain kinds of cyber threats, the rebuilding may be performed more quickly and using fewer computing resources. Providing faster rebuilding of software images allows for faster redeployment, which in turn improves security of computing environments. For example, faster redeployment may allow for replacing a vulnerable software container with a software which has been updated to be more secure when cyberattacks are underway or when a vulnerability is in imminent danger of being exploited.

As noted above, in an embodiment, a set of instructions of each software image recipe may define a corresponding software image with respect to a combination of packages such that the software image built using a given software image recipe includes each package among the combination of packages of the software image recipe. To this end, in a further embodiment, the set of instructions of each software image includes a description of each package to be used for building the software image and a description of how to obtain a latest version or release of the code of each package. The description of each package may be or may include an identifier (e.g., a name or identification number) of each portion of code used to create the package. The description of how to obtain the latest version or release of the code of each package may be or may include an indication of a location where each portion of code for each package is stored (e.g., in one or more code repositories). These descriptions may be generated by language models or otherwise based on outputs of language models created as discussed herein.

The various disclosed embodiments may be utilized for purposes such as, but not limited to, software image update management and securing computing environments via secured software images. Each software image is a file including executable code utilized to realize a given software component such as, but not limited to, a software container, a virtual machine, and the like. More specifically, each software image includes all of the code utilized to run a given software component, and may further include libraries, binaries, settings, and other data used to realize the corresponding software component. The recipes created as discussed herein may be utilized for efficiently rebuilding and redeploying software images for use in computing environments. In accordance with various disclosed embodiments, the executable code of at least some of the software images includes code for performing security functions or otherwise code that, when executed by a processing circuitry, configures the processing circuitry to perform certain security actions.

More specifically, to facilitate building software images, various disclosed embodiments utilize software image recipes in order to combine packages of code and configure images according to a set of heuristics. To this end, each software image recipe may be realized as a file including a set of instructions for building and configuring a software component such as a software container or virtual machine according to a predetermined definition of the software component. The set of instructions of each software image recipe may therefore be utilized to effectuate a set of rules for building and configuring the software component. In accordance with various disclosed embodiments, at least some of the software image recipes includes instructions that, when executed, cause building of a software image having at least some built in security functions (for example, by including code for performing such security functions in the file of the software image).

Accordingly, the software image recipes provide instructions for building software images defined with respect to code units in the form of packages, where combinations of packages may be used to realize different software images. In this regard, the packages may act as building blocks for software images, with the software image recipes providing the directions for combining these building blocks in order to assemble the code of a software image. That is, the packages may be adapted to perform discrete functions or sets of functions which might be utilized by different software images such that a given package may be used to provide its respective functions to different software images whose software image recipes indicate that the package is to be used for building their corresponding software images.

As noted above and in accordance with various disclosed embodiments, at least some of the packages may be security packages including code or other data used to execute security functions such that the software images built using recipes defined with respect to such security packages have some inherent security features built into the software images and, consequently, into software components such as software containers created by executing those software images.

By defining packages as units of code with respect to certain functions or combinations of functions, the packages as defined in the software image recipes may be flexibly combined for different types of software images. That is, any given package may be used as part of the recipe for different types of software images such as, but not limited to, a software container image and a virtual machine image. By defining software image recipes with respect to different sets of functions, and further by separating portions of code which perform certain functions within a given software component from portions of code used to run the software component (such as the kernel, operating system, and applications used to realize a virtual machine), the packages may be utilized to build different types of software images.

FIG. 1 shows an example network diagram 100 utilized to describe the various disclosed embodiments. In the example network diagram 100, computing environments 110 through 130 communicate with each other and with a user device 140 in order to realize various software image management techniques discussed herein. Any or all of such communications may be realized via one or more networks (not shown). Such a network may be, but is not limited to, a wireless, cellular or wired network, a local area network (LAN), a wide area network (WAN), a metro area network (MAN), the Internet, the worldwide web (WWW), similar networks, and any combination thereof.

As depicted in FIG. 1, the computing environment 110 is a computing environment in which an image manager 111 is deployed or otherwise realized. The image manager 111 may be realized as or via a server (not separately depicted). An example schematic diagram which may be utilized to realize such a server is discussed further below with respect to FIG. 8.

The image manager 111 is configured to manage software images used in one or more computing environments such as, but not limited to, the computing environment 120. More specifically, the image manager 111 is configured to build software images using software image recipes as described herein. As noted herein, such software image recipes may be, may include, or may otherwise be realized as a file including a set of instructions for building and configuring a software component such as a software container or virtual machine according to a predetermined definition of the software component. Such a recipe may be defined with respect to a set of software packages as well as configuration data for configuring a software component containing these packages. The software packages, in turn, are packages of code which may include code stored in one or more code repositories such as, but not limited to, the code repositories 131.

As discussed herein, in accordance with various disclosed embodiments, at least some of the software packages are security packages defining functions to be performed when a software image is executed in order to protect the software component deployed by executing the software image. To this end, in an embodiment, each security package includes code that, when executed by a processing circuitry (for example, a processing circuitry of one of the servers 122 used to deploy the corresponding software component), configures the processing circuitry to perform one or more security functions. This allows for building software images designed to protect themselves regardless of whether the environment in which they are deployed (for example, the computing environment 120) has security functions to protect against the same kinds of cyber threats. That is, the security packages allow for building self-protecting software images.

The software images created using the recipes may be stored in an image repository 112 for subsequent use. The recipes, along with other data used to build the software images (e.g., code retrieved from the code repositories 131, packages created using such code, and the like), may be stored in a database 113.

The computing environment 120 may be a client computing environment in which one or more servers 122 acting as clients for the image manager 111, the image repository 112, or both. To this end, the computing environment 120 includes one or more servers 122 running code used to realize software applications or otherwise to run code and, more specifically, to run code of software components including code among software images as discussed herein. To this end, the computing environment 120 may further include an image repository 121 utilized to store software images built by the image manager 111.

The computing environment 120 may further include one or more cybersecurity tools 123. Such cybersecurity tools 123 may be configured to monitor for potential cyber threats, to alert on potential cyber threats, to mitigate or remediate potential cyber threats, a combination thereof, and the like. In particular, in accordance with various disclosed embodiments, the cybersecurity tools 123 may be configured to alert on potential cyber threats and to include data indicating potentially vulnerable software images or portions thereof (e.g., packages), which in turn may be utilized to determine which software images may require rebuilding or redeployment (e.g., redeployment of the corresponding software component) as described herein. To this end, such alerts may be sent from the cybersecurity tools 123 to the servers 122, to the image manager 111, or both.

The computing environments 130-1 through 130-n (where n is an integer having a value greater than or equal to 1, also referred to as a computing environment 130 or as computing environments 130 for simplicity) may each include one or more code repositories 131. Such code repositories 131 may store code and, in particular, code released by developers or other entities that provide code intended to be packaged with other code to create code packages. Such code may be updated, for example, in new code releases, in order to patch vulnerabilities or otherwise improve the code. Code stored in the code repositories 131 may be downloaded (e.g., by the image manager 111) and utilized to build software images as discussed herein.

The user device 140 may be, but is not limited to, a personal computer, a laptop, a tablet computer, a smartphone, a wearable computing device, or any other device capable of receiving and displaying notifications. The user device 140 may be owned, operated, or otherwise used by a person or entity which may manage code deployed in the computing environment 120. As a non-limiting example, the user device 140 may be operated by a developer who manages code at least some of the software components deployed in the computing environment 120. The user device 140 may receive notifications (e.g., from the image manager 111) indicating that certain software images have been built or rebuilt and stored in the image repository 112. The user device 140 may be used to cause the servers 122 to download such software images for software component deployment (e.g., to download such software images and either store those in local storages of the servers 122, in the image repository 121, or both).

It should be noted that FIG. 1 depicts an implementation of various disclosed embodiments, but that at least some disclosed embodiments are not necessarily limited as such. Other deployments, arrangements, combinations, and the like, may be equally utilized without departing from the scope of the disclosure. For example, the image manager 111 may be deployed or otherwise realized in the computing environment 120 used to host the servers 122 on which software components are deployed without departing from the scope of at least some disclosed embodiments. Generally speaking, in at least some embodiments, any of the computing environments 110 through 130 may be combined at least partially (e.g., combining entities from different computing environments), or may be further separated into more computing environments (not shown), without departing from the scope of the disclosure.

Figure 2:
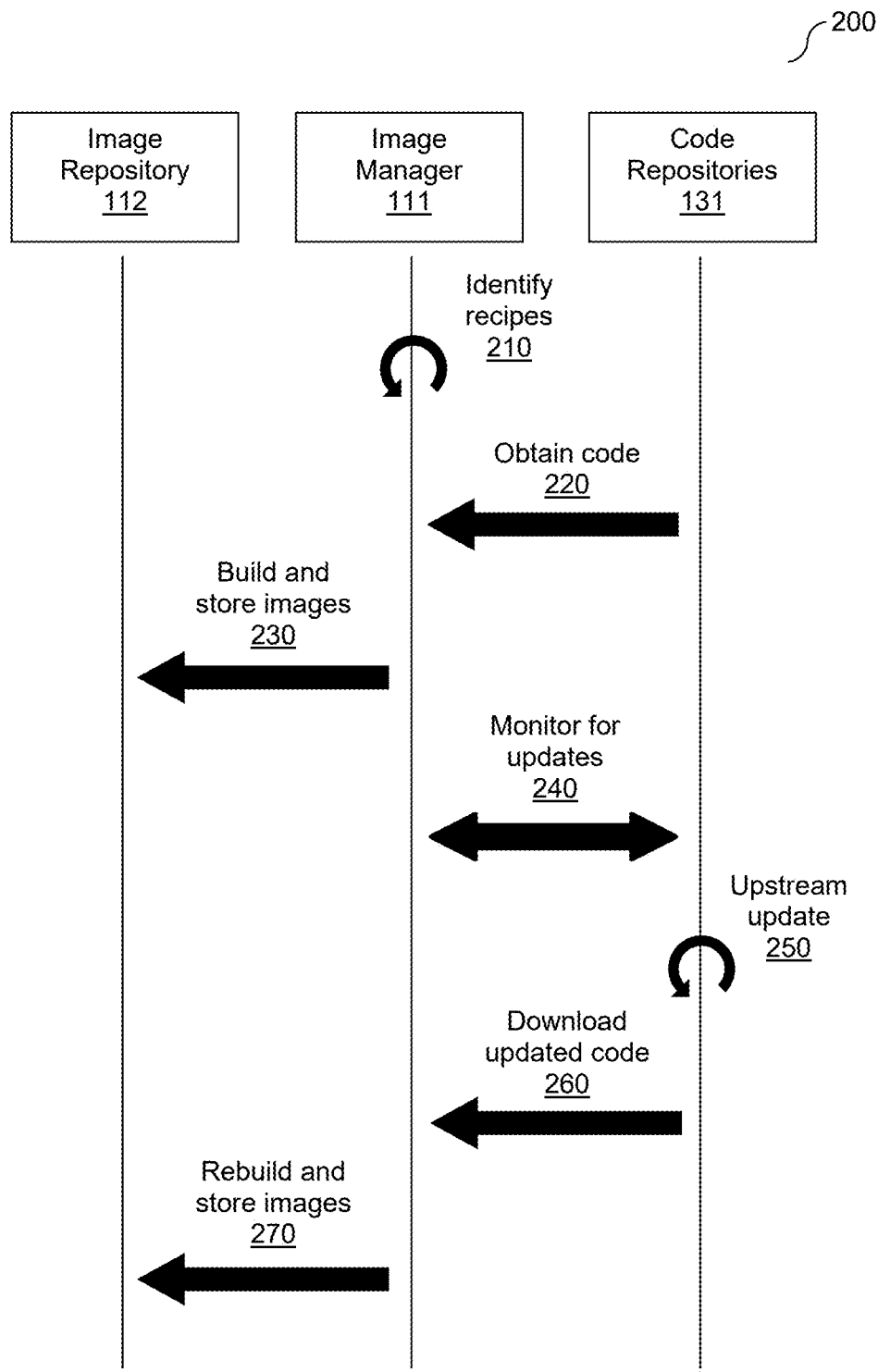
FIG. 2 is a flow diagram illustrating building and maintaining an image repository in accordance with various disclosed embodiments.

FIG. 2 is a flow diagram 200 illustrating building and maintaining an image repository in accordance with various disclosed embodiments. FIG. 2 depicts communications between and among the image repository 112, the image manager 111, and the code repositories 131, FIG. 1.

As depicted in FIG. 2, at 210, the image manager 111 identifies one or more software image recipes to be utilized for building software images in order to populate the image repository 112. Such recipes may be predetermined or otherwise provided by an entity that designs software images for use in deploying software components. As discussed herein, each recipe is a file including code defining software packages to be combined in order to build a corresponding software image. Also discussed herein, in accordance with various disclosed embodiments, at least some of the software packages in at least some of the recipes may be security packages including code for performing certain security functions.

At 220, the image manager 111 obtains code from one or more of the code repositories 131. As discussed herein, such code includes code used to create packages or otherwise to build software images. The obtained code may be obtained as packages, or may be obtained as other discrete portions of code to be used for creating packages. When the software images are virtual machine images or other software images which utilize additional code or to run, the obtained code may further include such additional code (e.g., code of kernels and operating systems used to realize virtual machines). In accordance with various disclosed embodiments, at least some of the obtained code includes code that, when executed by a processing circuitry, configures the processing circuitry to perform certain security functions.

At 230, the image manager 111 builds one or more software images and stores the built software images in the image repository 112. More specifically, as described herein, the image manager 111 builds the software images using software image recipes (e.g., the recipes identified at 210). That is, the image manager 111 builds the software images by combining packages and configuring the software images according to their corresponding recipes. When the software images are virtual machine images or other software images which utilize additional code to run, the software images may be built to include such code.

Once the image repository 112 has been populated with images built using the recipes, the image repository 112 may be updated as code used by those images are updated. To this end, in some embodiments, at 240, the image manager 111 monitors for updates to code in the code repositories 131 in order to identify updates to code (e.g., code releases) for code used by software images.

More specifically, as described herein, the image manager 111 may be configured to monitor for updates with respect to upstream code (e.g., as determined based on code dependencies of code in software images). When an upstream update occurs in one of the code repositories at 250, the image manager 111 may download the updated code at 260. The updated code, in turn, may be utilized to rebuild and store one or more of the software images at 270 (e.g., software images including older versions of the updated code may be rebuilt with the updated code).

It should be noted that FIG. 2 depicts a flow including both building and rebuilding images, but these processes may be realized as separate flows without departing from the scope of the disclosure. Additionally, in some embodiments, updated code may only be downloaded, images may only be rebuilt, or both, when certain conditions are met. As a non-limiting example, code may only be automatically downloaded and used to rebuild images when the code contains a vulnerability patch or other cybersecurity-relevant updates. In such embodiments, code may be manually downloaded and used to rebuild images at the direction of an operator (e.g., a user of the user device 140, FIG. 1) when inputs indicating certain portions of code to download, certain software images to check for potential code updates, or both, are received.

Figure 3:
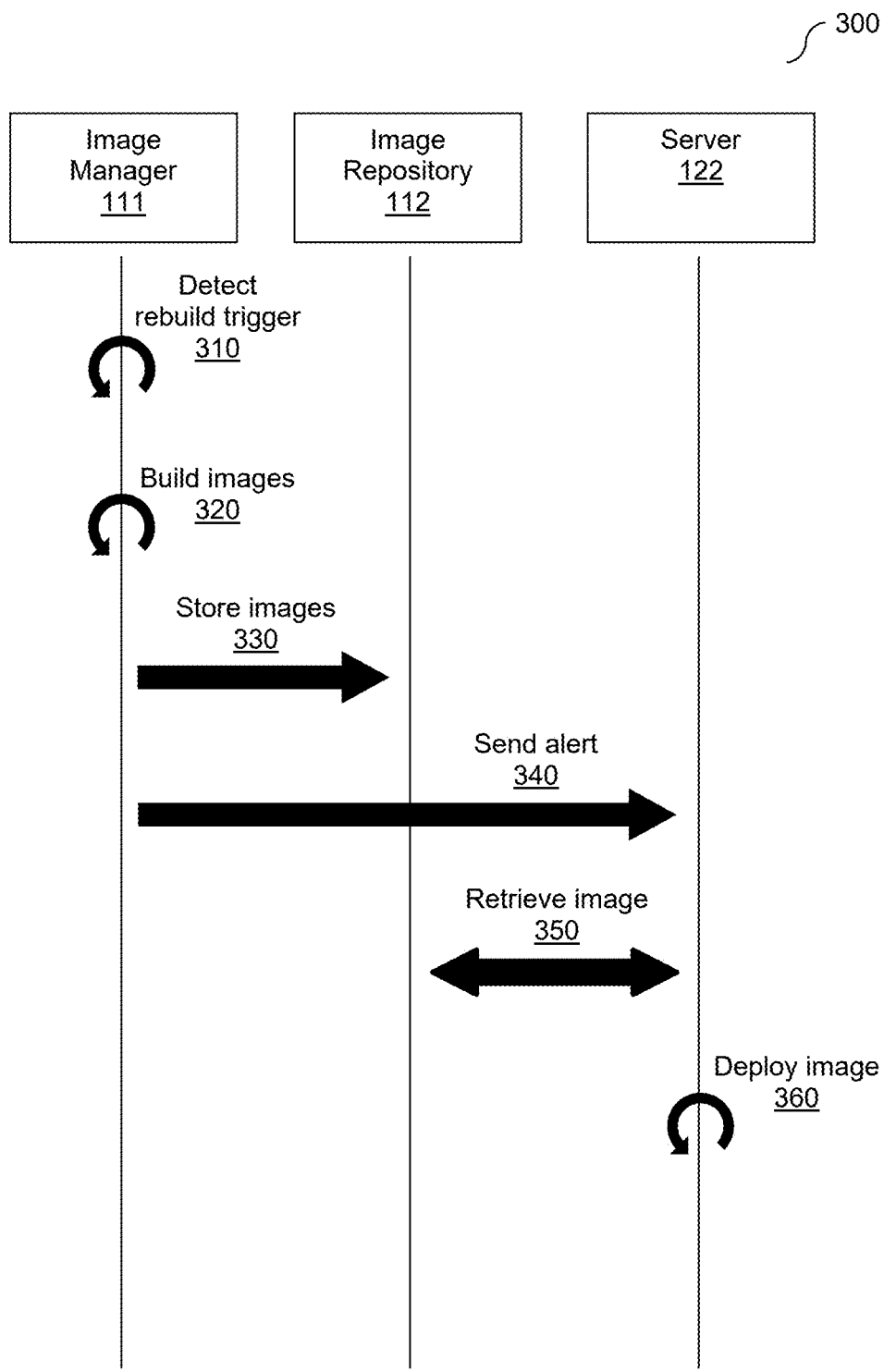
FIG. 3 is a flow diagram illustrating providing a new image for deployment in accordance with various disclosed embodiments.

FIG. 3 is a flow diagram 300 illustrating providing a new image for deployment in accordance with various disclosed embodiments. FIG. 3 depicts communications between and among the image repository 112, the image manager 111, and the server 122, FIG. 1.

As depicted in FIG. 3, optionally at 310, a rebuild trigger is detected. Such a rebuild trigger may be an update to code used by a software image, or may be such an update which meets certain criteria (e.g., includes vulnerability patches or other cybersecurity-related updates). In some embodiments, the rebuild trigger may be or may be detected based on identification of a cyber threat targeting or otherwise affecting a given software image. For a software image containing one or more security packages, rebuilding when a cyber threat targeting the image is detected may allow for effectively automatically updating the code used to secure the image (i.e., by obtaining and incorporating a current or otherwise latest version of code of the security packages of the image).

At 320, software images are built or rebuilt by the image manager 111. When images are rebuilt, updated code for those images may be downloaded and used for rebuilding. At 330, the newly built or rebuilt images are stored in the image repository 112.

At 340, the image manager 111 may generate and send an alert to one of the servers 122. The alert may indicate, for example, that a given software image has been rebuilt and is available for download, whether the software image includes a cybersecurity update (e.g., includes code with a vulnerability patch), both, and the like.

When the server 122 has received the alert, the server 122 may retrieve an image from the image repository 112 at 350 and deploy 360 the retrieved image (e.g., by running the image in order to deploy the corresponding software component for the image).

It should be noted that FIG. 3 depicts the server 122 retrieving an image directly from the image repository 112 in accordance with at least some embodiments, but that the image may be obtained by the server 122 in other ways in at least some embodiments. For example, in some embodiments, the image manager 111 may transmit the image to the server 122 at 340 in addition to or instead of sending the alert.

Figure 4:
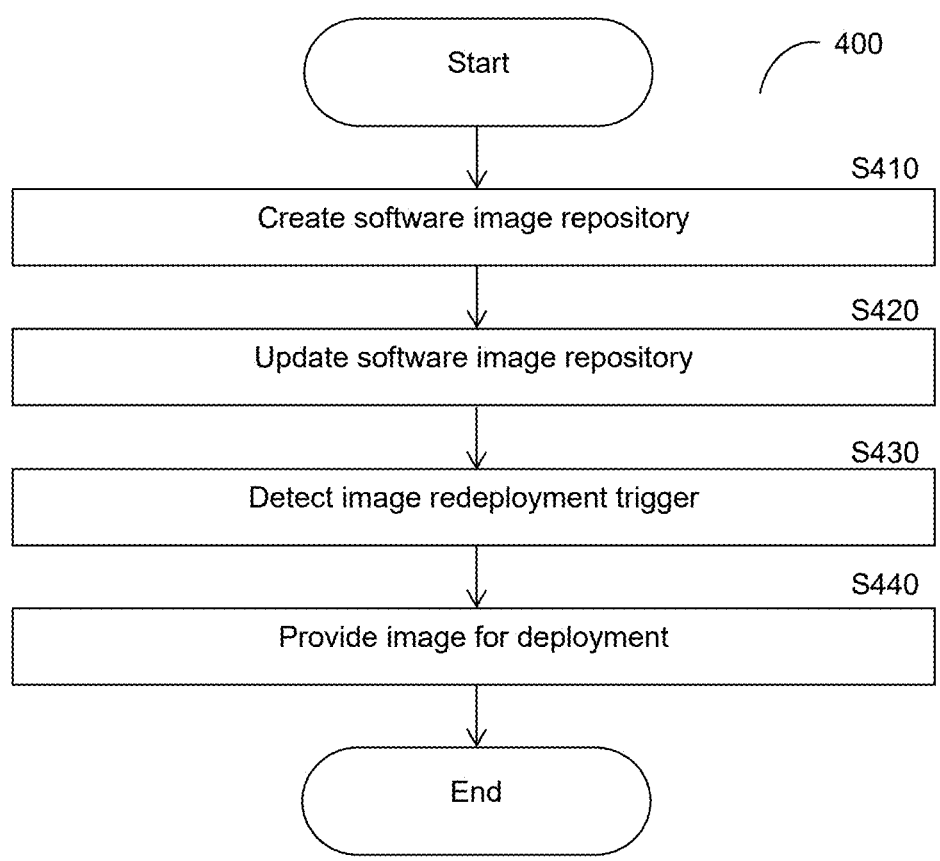
FIG. 4 is a flowchart illustrating a method for software image update management according to an embodiment.

FIG. 4 is a flowchart 400 illustrating a method for software image update management according to an embodiment. In an embodiment, the method is performed by the image manager 111, FIG. 1.

At S410, a software image repository is created. In an embodiment, creating the software image repository includes building one or more software images according to respective software image recipes and storing the built images in the software image repository.

As discussed herein, such a software image recipe may be or may include a file having executable code utilized to realize a given software component such as, but not limited to, a software container, a virtual machine, and the like. To this end, each software image recipe may be realized as a file including a set of instructions for building and configuring a software component such as a software container or virtual machine according to a predetermined definition of the software component. The set of instructions of each software image recipe may therefore be utilized to effectuate a set of rules for building and configuring the software component.

More specifically, the set of instructions of each software image recipe defines a corresponding software image with respect to a combination of packages (also referred to as software packages) such that the software image built using a given software image recipe includes each package among the combination of packages of the software image recipe. To this end, the set of instructions of each software image includes a description of each package to be used for building the software image and a description of how to obtain a latest version or release of the code of each package. The description of each package may be or may include an identifier (e.g., a name or identification number) of each portion of code used to create the package, a location (e.g., a location within a repository or otherwise a location in storage) of the package or of the code used to create the package, both, and the like. The description of how to obtain the latest version or release of the code of each package may be or may include an indication of a location where each portion of code for each package is stored (e.g., in one or more code repositories).

Also discussed herein, the combination of packages for any or all of the software image recipes may include one or more security packages, where each security package is a package containing code that performs one or more security functions when executed. Accordingly, software images built using software image recipes defined with respect to such security packages are configured with innate security capabilities, that is, such software images are able to perform certain security functions in order to effectively protect itself against certain kinds of cyber threats. The software image repository therefore may include software images designed for this self-protection which are created using software image recipes as discussed herein.

Each software image built using a corresponding software image recipe includes all of the code utilized to run a given software component, and may further include libraries, binaries, settings, and other data used to realize the corresponding software component. When a software image is for a virtual machine, the software image may further include an operating system, applications, and other data used to realize a virtual machine. The corresponding software image recipe for a given software image may therefore identify such code and other data (e.g., by location in storage, by identifier, by a combination thereof, and the like) such that a software image may be built at least by combining packages identified in the corresponding software image recipe.

An example process for creating a software image repository is described further below with respect to FIG. 5.

At optional S420, the software image repository may be updated. As a non-limiting example, as new code releases are made available such that code used by software images becomes updated, some or all of those software images may be updated accordingly by downloading new code, packaging the new code into new packages, and combining the new packages according to the corresponding software image recipes for software images. To this end, in an embodiment, updating the software image repository includes rebuilding one or more of the software images stored in the software image repository.

In some embodiments, the software image repository may be updated when a vulnerability is discovered in one of the software images stored in the repository or when a software component realized by executing one of the software images stored in the repository is targeted or otherwise affected by a cybersecurity threat. In such an embodiment, vulnerable software images or software images for which the corresponding software components are being targeted by cybersecurity threats may be rebuilt in real-time in order to secure against the cybersecurity threats. As noted herein, rebuilding a software image using its corresponding software image recipe may include obtaining and using an updated or otherwise current version of the code of any security packages contained therein. When a software image is vulnerable, updating its security packages may reduce or avoid any harm to the software image.

Alternatively or in combination, updating the software image repository may include adding one or more additional security packages to any or all of the software images stored in the repository. As a non-limiting example, a security package designed to mitigate or otherwise protect against a certain type of cybersecurity threat may be added to any software images that are vulnerable to that type of cybersecurity threat, whose software components are targeted or otherwise affected by that type of cybersecurity threat, and the like.

To this end, in a further embodiment, updating the software image repository includes updating one or more of the software image recipes to include the added security packages among the combinations of packages of those software image recipes and rebuilding the software images using the updated software image recipes. In a further embodiment, new software image recipes may be generated, for example, using generative artificial intelligence (genAI).

To this end, in some such embodiments, a language model or other genAI model configured to generate text may be prompted with a prompt including a predetermined portion of text, one or more portions of text of the software image recipe to be updated, and one or more portions of text of the security packages to be added to the software image recipe. As a non-limiting example, a prompt including the predetermined text "Generate a new software image recipe based on this software image recipe and the following security package" as well as text of the current software image recipe and text of the security package to be added may be provided to a large language model (LLM), and the LLM may return text of a new software image recipe.

Example processes for generating software images using genAI models which may be utilized to generate updated software image recipes in order to update the software image repository is described further below with respect FIG. 6.

An example process for updating the software image repository is described further below with respect to FIG. 6.

At optional S430, a software image redeployment trigger may be detected. The redeployment trigger may be defined such that software images are only redeployed when certain criteria are met. To this end, in an embodiment, detecting the software image redeployment trigger includes applying one or more redeployment trigger detection rules defined with respect to such criteria. In some embodiments, the redeployment trigger detection rules may be defined such that the trigger is detected when a vulnerability in a software image is being exploited.

In some embodiments, the redeployment trigger may be defined with respect to cybersecurity threats such that a software image is redeployed when a cyber threat or potential cyber threat is detected, when a vulnerability is identified, and the like. In a further embodiment, a redeployment trigger is detected when a vulnerability in one or more software components deployed using one or more of the software images is actively being exploited. An example process for detecting a software image redeployment trigger based on cybersecurity data which may be utilized at S430 is described further below with respect to FIG. 7.

At S440, the software image is provided for deployment. In an embodiment, providing the software image includes storing the software image in a repository (e.g., the image repository 112 or the image repository 121, FIG. 1). The software image may be retrieved by one or more servers (e.g., the servers 122, FIG. 1) from the repository, either directly or by sending a request to a system having access to the repository (e.g., the image manager 111, FIG. 1).

Figure 5:
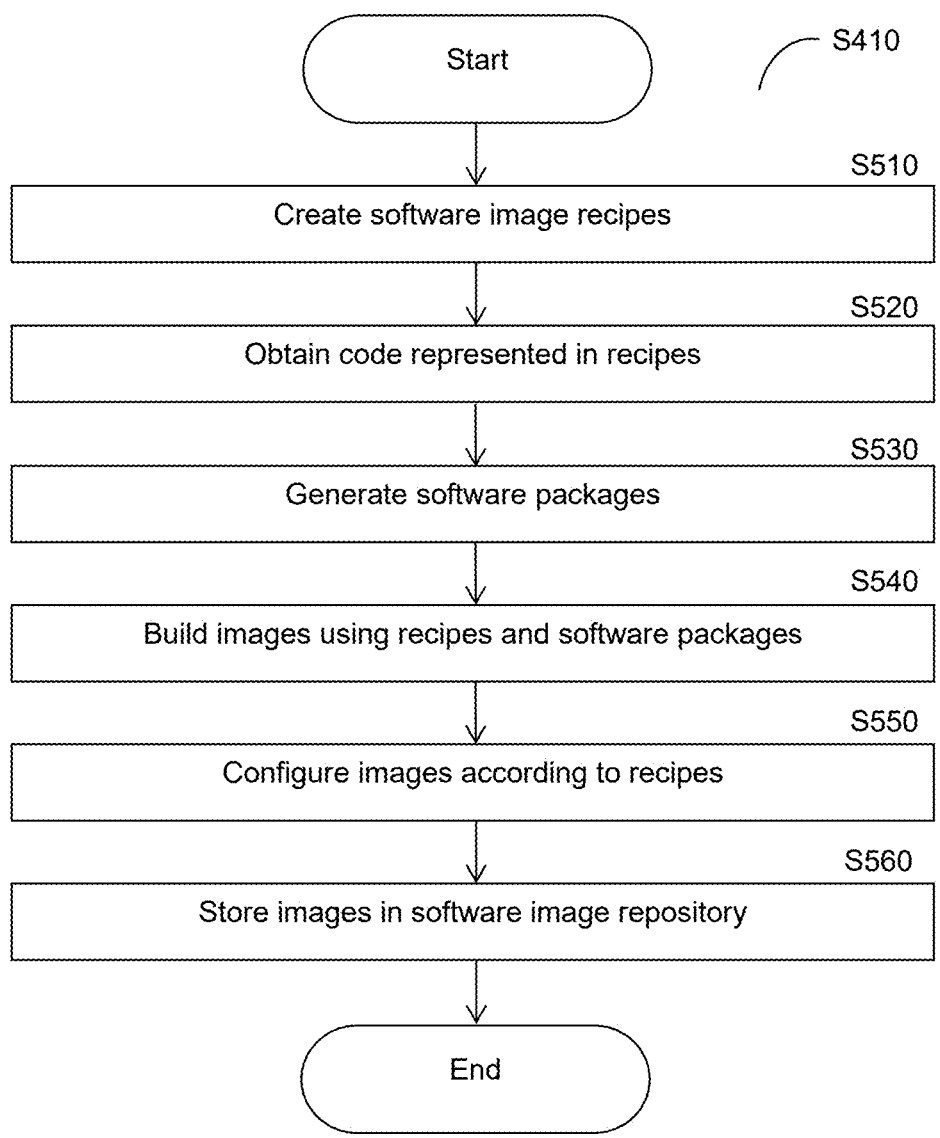
FIG. 5 is a flowchart illustrating a method for creating a software image repository according to an embodiment.

FIG. 5 is a flowchart S410 illustrating a method for creating a software image repository according to an embodiment.

At S510, software image recipes to be used for creating software images are identified. The identified software image recipes may be or may include software image recipes among a predetermined list of recipes to be used for populating, for example, a given software image repository. Such a predetermined list may be defined, for example, by an entity which owns or operates a computing environment (e.g., the computing environment 120, FIG. 1) in which the software image repository resides, a computing environment in which servers utilize software images stored in the software image repository to deploy software components, both, and the like.

As noted above, each software image recipe may be or may include a file having executable code utilized to realize a given software component such as, but not limited to, a software container, a virtual machine, and the like. To this end, in an embodiment, each software image recipe is realized as a file including a set of instructions for building and configuring a software component such as a software container or virtual machine according to a predetermined definition of the software component. The set of instructions of each software image recipe may therefore be utilized to effectuate a set of rules for building and configuring the software component.

In a further embodiment, the set of instructions of each software image recipe defines a corresponding software image with respect to a combination of software packages (also referred to as packages such that the software image built using a given software image recipe includes each package among the combination of packages of the software image recipe. To this end, the set of instructions of each software image includes a description of each package to be used for building the software image and a description of how to obtain a latest version or release of the code of each package as discussed above, for example with respect to FIG. 4. In yet a further embodiment, the set of instructions for each software image recipe further defines a configuration for the corresponding software image, and the software image built using a corresponding software image recipe is configured in order to match the configuration defined in the corresponding software image recipe.

At S520, code of software packages represented in the identified software image recipes is obtained. Such code may be, for example but not limited to, retrieved from one or more code repositories (e.g., one or more of the code repositories 131, FIG. 1). The code may include, but is not limited to, binaries or other code to be included in respective packages. In an embodiment, S520 may further include obtaining any associated files (e.g., files associated with respective binaries containing libraries or other resources to be used by those binaries).

In an embodiment, the code may be included in package definitions of packages which define portions of code to be utilized for creating each package. Such package definitions may identify code with respect to identifier, location (e.g., location in storage), and the like. In such an embodiment, the code may therefore be obtained based on such package definitions, for example by obtaining code having certain identifiers or locations in storage.

At S530, software packages are generated using the obtained code. In an embodiment, the packages may be generated using package generation rules which define how each package is to incorporate each portion of code included therein. More specifically, the package generation rules may define templates or other predetermined portions of packages into which portions of code are to be inserted or otherwise which are to be combined with portions of code. In accordance with various disclosed embodiments, the resulting software packages may include one or more security packages having code for performing certain security functions.

In some embodiments, any or all of the obtained code may be retrieved in a pre-packaged format (e.g., already organized into software packages). In such embodiments, any such pre-packaged software packages may be utilized to build software images during subsequent processing.

At S540, software images are built using their corresponding software image recipes and the packages generated at S530, any pre-packed software packages, or both. That is, each software image is built using its corresponding software image recipe by at least combining packages according to the software image recipe. More specifically, for each recipe, a subset of the packages generated at S530 or otherwise a subset of a set of packages is combined in order to build the corresponding software image for the recipe. In accordance with various disclosed embodiments, some or all of the software images are built using code of security packages such that the software components realized via those software images have certain innate cybersecurity protection capabilities.

At S550, the software images are configured according to their corresponding software image recipes. As noted above, each software image recipe may include configuration instructions or otherwise provide configuration data indicating how the software image is to be configured.

At S560, the built software images are stored in one or more software image repositories (e.g., the repository 112, FIG. 1) for subsequent use or access.

Figure 6:
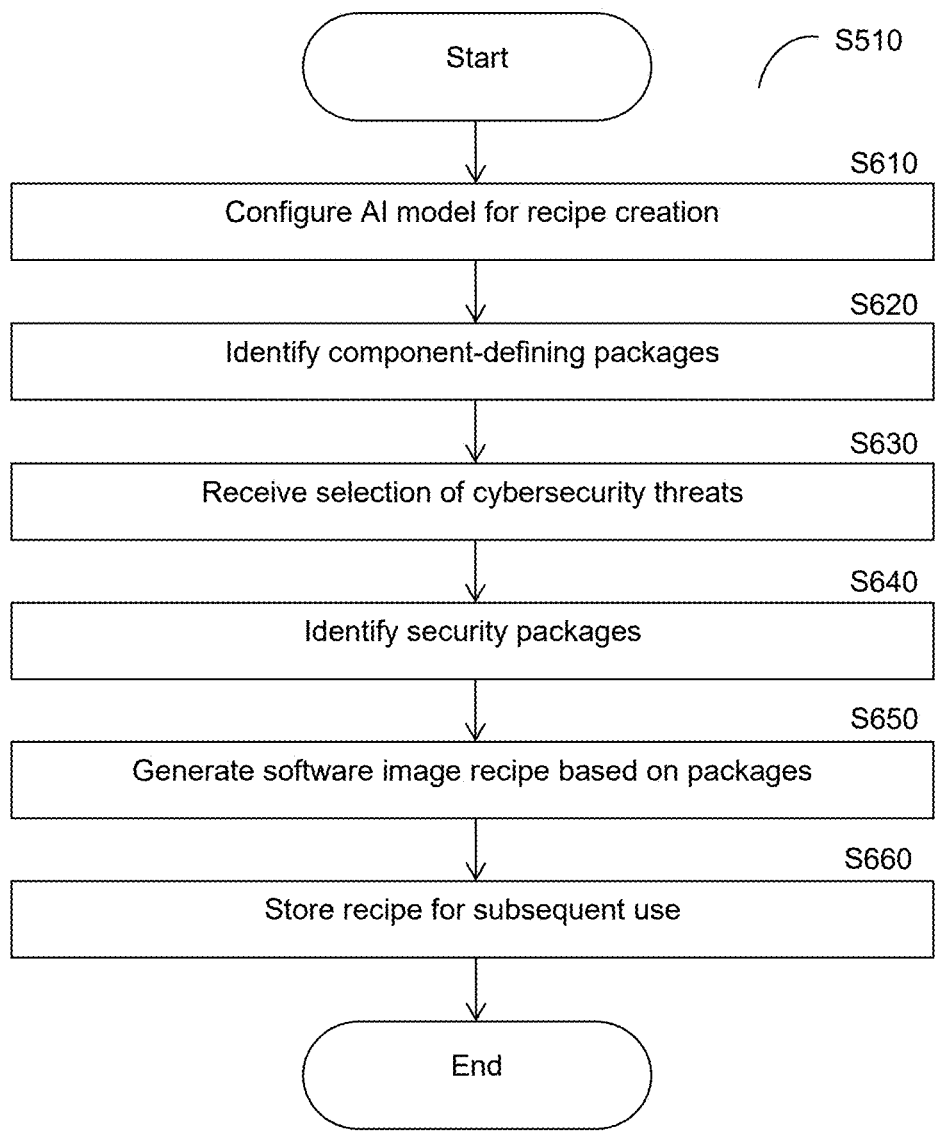
FIG. 6 is a flowchart illustrating a method for creating recipes that define software images with respect to security packages according to an embodiment.

FIG. 6 is a flowchart S510 illustrating a method for creating recipes that define software images with respect to security packages according to an embodiment. In an embodiment, the method is performed by the image manager 111, FIG. 1.

At optional S610, an artificial intelligence model may be configured for recipe creation in order to enable the model to create the software image recipe. That is, the model may be configured in order to generate one or more software image recipes.

In an embodiment, the model is or includes a machine learning model such as, but not limited to, a language model or generative artificial intelligence model. Such a language model is configured to generate text in natural language based on inputs such as text. As a non-limiting example, the model may be a large language model (LLM). In an embodiment, the model is configured in order to process textual inputs identifying an application for which a software image recipe is to be created, and the model is further configured to output data to be used as the software image recipe or otherwise to be used for creating the software image recipe (for example, text to be included in the software image recipe or a file including such text).

At S620, one or more component-defining packages are identified. The component-defining packages define the base functions of the software component to be realized via the software image built using the software image recipe being created. That is, the component-defining packages are software packages including code for performing functions of the software component such as, but not limited to, functions of an application to be realized via the software image recipe.

At optional S630, one or more selections of cybersecurity threats may be received. The selections of cybersecurity threats may be received as, for example, selections of certain predetermined types of cybersecurity threats. In some embodiments, the selected types of cybersecurity threats may be among a set of predefined cybersecurity threat types. In a further embodiment, each cybersecurity threat type among the predefined cybersecurity threat types may be associated with one or more predetermined security packages. The associated security packages for a given cybersecurity threat type may be security packages designed to mitigate or remediate that type of cybersecurity threat.

In some embodiments, the selections of cybersecurity threats may be received in the form of text, for example, text indicating or describing the types of cybersecurity threats to be protected against. Such text may be processed by an artificial intelligence (AI) model such as, but not limited to, a language model (for example, a LLM) or other generative AI (genAI) model configured to process text inputs. When such an AI model has access to tools that allow the AI model to access code bases, the AI model may be able to autonomously identify and obtain code having metadata or other text describing the types of cybersecurity threats that the code is designed to protect against.

At S640, one or more security packages to be used for creating the software image recipe are identified. The security packages to be used for creating the software image recipe may be predetermined, may be identified based on user inputs (for example, user inputs indicating which security packages should be used), or based on the selection of cybersecurity threats at S630.

When selections of cybersecurity threats are received and the selected cybersecurity threats are associated with respective sets of one or more security packages, the identified security packages may include any security packages associated with the selected cybersecurity threats. To this end, each cybersecurity threat type may be a predetermined type of cybersecurity threat associated with a predetermined security package. The associations between types of cybersecurity threats and security packages may be stored in a table for lookup when security packages are to be identified based on selected cybersecurity threats.

When the selections of cybersecurity threats are received in the form of text, identifying the security packages may include prompting a generative artificial intelligence (genAI) model using the text indicating the selected cybersecurity threats. Such tools may include, but not limited to, application programming interfaces (APIs), which allow the genAI model to retrieve code such as code of the security packages to be defined in the set of instructions of a software image recipe. As a non-limiting example, such a tool may be an API used to call functions in order to access a code repository, and the genAI model may be provided access to that API by prompting the AI using text including a textual description of the API, the functions the API uses, the format or other details about how to call those functions, or a combination thereof.

To this end, the prompt may also include or the genAI model may be further prompted with text indicating details about how to access the tool such as, but not limited to, a network location of the tool, formats and other details about how to make function calls to the tool, textual descriptions of different functions of the tool, details about repositories or other data sources which may be accessed using the tool, combinations thereof, and the like. This allows the genAI model to obtain and add code of security packages without requiring providing the security packages explicitly to the genAI model.

In some embodiments, each security package includes one or more functions used for defending against a single type of cybersecurity threat vector or otherwise a single type of cybersecurity threat. That is, each security function may be designed to secure a resulting software component against threat vectors of that type. Recipes may define a software image with respect to one or more security packages such that the resulting software component is protected against one or more respective kinds of threat vectors. In this regard, the security packages may act as discrete units which may be flexibly combined in order to protect against different combinations of threat vectors or cybersecurity threats. In a further embodiment, each security package corresponds to exactly one type of cybersecurity threat or threat vector such that each security package is a discrete unit of code designed to protect against only a corresponding type of cybersecurity threat or threat vector.

As noted above, defining security packages with code used for distinct kinds of cybersecurity threats or threat vectors allows for reducing the amount of processing resources used to store and execute code, for example, instructions of software image recipes, code of the software packages of software images built using the software image recipes, and the like. Additionally, defining security packages with respect to distinct kinds of threats or threat vectors allows for faster rebuilding of software images, which allows for responding to the identified cybersecurity threats faster. That is, the discrete nature of the software packages may be leveraged in order to provide security packages providing discrete security functions, which in turn allows for minimizing the computing resources and time needed to store and redeploy software images.

At S650, the software image recipe is generated based on the component-defining packages and the security packages. In an embodiment, the software image recipe is a file including executable code utilized to realize a corresponding software component such as, but not limited to, a software container, a virtual machine, and the like. In a further embodiment, each software image built using the software image recipe includes all of the code utilized to run a given software component, and may further include libraries, binaries, settings, and other data used to realize the corresponding software component. To this end, the software image recipe is generated such that it is defined with respect to a combination of software packages including the component-defining packages and the security packages.

In a further embodiment, the software image recipe includes a set of instructions that, when executed by a processing circuitry, configures the processing circuitry to build a software image of the corresponding software component for the software image recipe. To this end, in a further embodiment, the set of instructions of each software image includes a description of each package to be used for building the software image and a description of how to obtain a latest version or release of the code of each package. The description of each package may be or may include an identifier (e.g., a name or identification number) of each portion of code used to create the package. The description of how to obtain the latest version or release of the code of each package may be or may include an indication of a location where each portion of code for each package is stored (for example, in one or more code repositories).

In an embodiment, the software image recipe is generated at least partially using an artificial intelligence (AI) model such as a genAI model. In a further embodiment, the genAI model is a language model such as, but not limited to, a large language model (LLM). When a genAI model is used to identify the security packages at S640, the language model used to generate the software image recipe may be the same genAI model, a different genAI model, the same genAI model but in a different session, and the like. That is, the genAI model for identifying the security packages may be the same or different from the genAI model used to generate the software image recipe, and these activities (identifying the security packages and generating the software image recipe) may be performed based on the same prompt or based on different prompts.

To this end, in some embodiments, the genAI model may be prompted with a textual description of the kind of security functions which are to be added to the software image recipe. Such a textual description may describe the security functions to be performed by the resulting software component realized by executing the software image built using a given software image recipe, or may describe the type of cybersecurity threat to be protected against. When the code used for the security packages is stored associated with metadata or other data describing the types of cybersecurity threats each set or unit of code is designed to protect against, this may allow the genAI model to identify appropriate code to be added as security packages to the updated software image recipes without needing to explicitly provide the security packages to be added.

In an embodiment, the genAI model may be provided with access to one or more tools such as, but not limited to, application programming interfaces (APIs), which allow the genAI model to retrieve code such as code of the software packages to be defined in the set of instructions of a software image recipe. To this end, the prompt may also include or the genAI model may be further prompted with text indicating details about how to access the tools such as, but not limited to, a network location of the tools, formats and other details about how to make function calls to the tools, textual descriptions of different functions of the tools, combinations thereof, and the like. This allows the genAI model to obtain and add code of security packages without requiring providing the security packages explicitly to the genAI model.

In some embodiments, the software image recipe further includes instructions for establishing a communication channel with a control system or service. Such a control system or service may be configured to maintain configurations of software images built using software image recipes including the communication channel establishment instructions, and may therefore allow for software images to continue to run statelessly while modifying or otherwise maintaining the configuration of those software images centrally by the control system.

At S660, the software image recipe is stored for subsequent use. As discussed herein, the software image recipe may be used in order to build a software image by executing the software image recipe via a processing circuitry, thereby causing the processing circuitry to become configured to obtain and assembly the software packages defined in the software image recipe into the software image.

Figure 7:
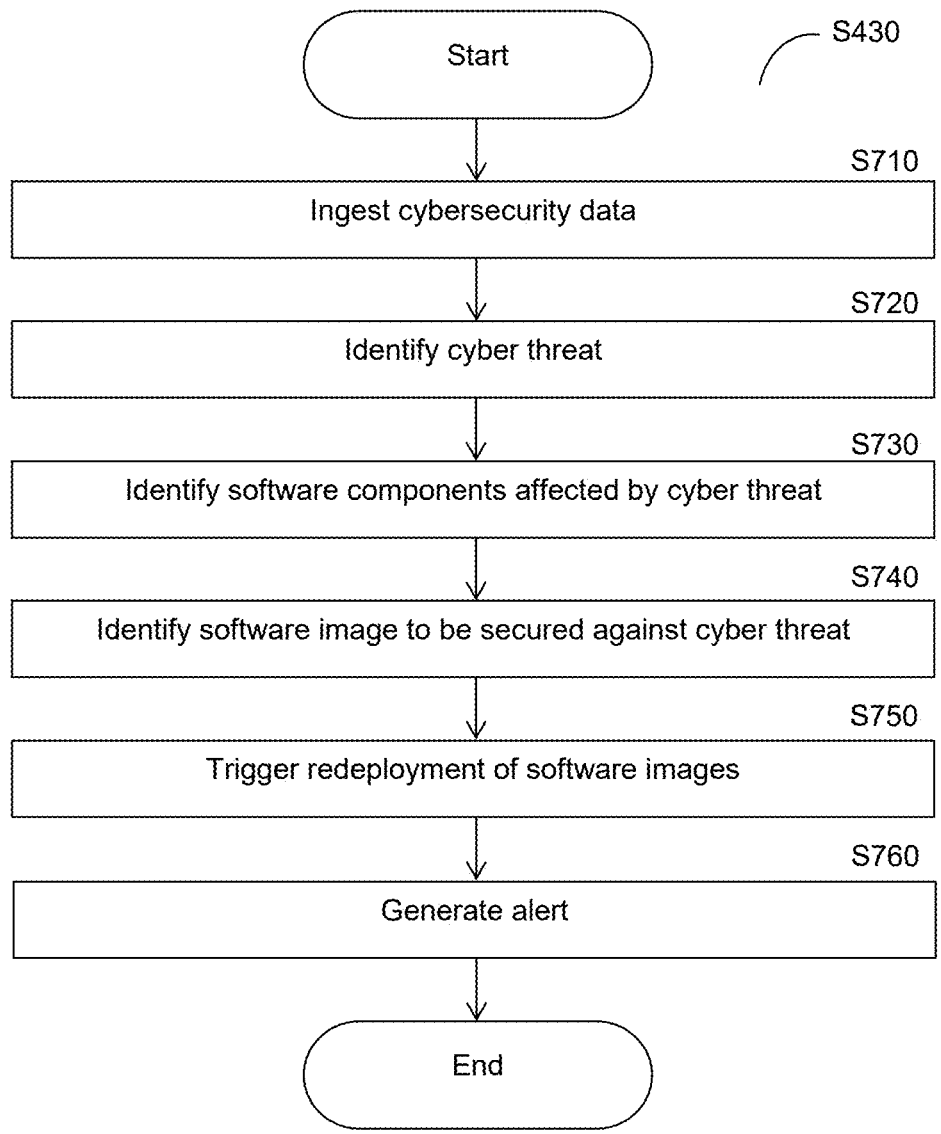
FIG. 7 is a flowchart illustrating a method for detecting a software image redeployment trigger according to an embodiment.

FIG. 7 is a flowchart S430 illustrating a method for detecting a software image redeployment trigger according to an embodiment. In an embodiment, the method is performed by the image manager 111, FIG. 1.

At S710, cybersecurity data is ingested. The cybersecurity data may be ingested from one or more cybersecurity tools (for example, scanners) deployed in or with respect to one or more computing environments in which software components realized using software image recipes are deployed. That is, the cybersecurity data may include data indicating potential cybersecurity threats to software components deployed in those computing environments. To this end, the cybersecurity data may indicate detected cybersecurity threats, and may further indicate types of cybersecurity threats which are detected, software components targeted or otherwise affected by those cybersecurity threats, both, and the like.

At S720, a cybersecurity threat (also referred to as a cyber threat) is identified based on the ingested cybersecurity data. In an embodiment, the cybersecurity threat is further identified with respect to a predetermined type of cybersecurity threat. As discussed further below, certain types of cybersecurity threats may have known associated with certain security packages or certain security functions which may be realized via code included in security packages. Accordingly, identifying the type of cybersecurity threat may aid in identifying appropriate security packages for protecting against the cybersecurity threat.

At optional S730, one or more software components targeted or otherwise affected by the cybersecurity threat are identified. In an embodiment, the identified software components are software components realized by executing respective software images. The respective software images, in turn, are built using software image recipes as described herein such that the software images may be rebuilt using their software image recipes in order to effectively update the code of the software packages used to build the software images, which in turn allows for securing the software images against cybersecurity threats using the updated code.

At S740, a software image to be secured against the cyber threat is identified. In an embodiment, the software image to be secured is a software image corresponding to one or more of the affected software components identified at S730. That is, the software image which was executed in order to realize one or more of the affected software components is identified as the software image to be secured.

At S750, redeployment of one or more software images is triggered. In an embodiment, redeploying each software image includes rebuilding the software image using the respective software image recipe for the image. As noted above, by rebuilding a software image using its respective software image recipe, the software image may be rebuilt using current or otherwise updated versions of code among its software packages (and, specifically, among the security packages). This may effectively allow for patching the software image with new software, which in turn may include new code designed to protect or further protect against cybersecurity threats.

Alternatively or in combination, the software image may be rebuilt using an updated software image recipe including updated instructions for configuring the software image. Such updated configuration instructions allow for effectively updating the software image without needing new software packages. To this end, redeploying the software images may include retrieving new or otherwise updated versions of their respective software image recipes.

To this end, in some embodiments, redeploying a software image includes rebuilding the software image using one or more updated software packages. In a further embodiment, the updated software packages include one or more new portions of code (i.e., portions of code which were not present in the previous version of the software image being rebuilt) which change the operation of the resulting software image when the software image is executed via a processing circuitry in order to secure or further secure the software component realized by executing the software image against the identified cyber threats.

In some embodiments, the software images may be rebuilt using new security packages, i.e., security packages that were not among the combination of software packages of the previous version of the software image being rebuilt. That is, new security packages which were not included in a previous version (for example, the most recent version or otherwise the currently deployed version) of the software image being rebuilt may be added to the software image in order to reinforce the security of the software image against the identified cybersecurity threats. Adding new security packages when rebuilding software images may therefore allow for targeting security measures against cybersecurity threats which are actively targeting certain software components or otherwise against cybersecurity threats which would otherwise exploit vulnerabilities in those software components.

In particular, new security packages may be added in order to protect against previously unknown or unobserved vulnerabilities. For example, new security packages may be added to software images in order to effectively patch the software images to protect against day-0 vulnerabilities. This may be useful, for example, in order to provide targeted protection against certain kinds of common cybersecurity threats which are known to exploit such vulnerabilities.

In some further embodiments, at least some of the new security packages may be added to the software image recipe for the software image to be rebuilt. To this end, rebuilding at least some of the software images may include generating new software image recipes, where the new software image recipes include new security packages to be used for securing the rebuilt software images against the identified cybersecurity threats. Generating the new software image recipes may include prompting a genAI model with a prompt identifying each software image recipe for which new versions of those software image recipes are to be generated as well as identifying the security packages or security functions to be incorporated into the new software packages. For example, such a prompt may include a predetermined portion of text "Generate a new file of a software image recipe based on the following file. Include code of the following security package in the new file."

In yet a further embodiment, the prompt input to the genAI model in order to generate the new software image recipes may include a textual description of cybersecurity threats indicated in the ingested cybersecurity data or otherwise text of the ingested cybersecurity data. Prompting the genAI model using text of the ingested cybersecurity data may allow the genAI model to automatically identify appropriate security packages to be added in a code repository or other database, for example based on text describing the kinds of cybersecurity threats that the security packages are designed to protect against which is stored in such a database. Using genAI to identify the new software image recipes may allow for more flexibly responding to cybersecurity threats, particularly when responding to new or otherwise previously unobserved kinds of cybersecurity threats. This, in turn, allows for improving the software image recipes such that software image recipes built using the improved software image recipes are more resilient to evolving cybersecurity threats.

Alternatively, instructions for securing the software image during building by adding the additional security package may be executed by the system building software images in order to add the security packages without necessarily updating or otherwise changing the software image recipes. This may allow for keeping the software image recipes light, that is, minimize the number of packages (and therefore code) defined in the software image recipes and avoiding accumulation of packages over time (which would result in increased computing resources to build and execute software images using those recipes). That is, in some embodiments, additional security packages may be added to the software image directly rather than adding indicators of security packages to the combination of packages defined in the software image recipe for that software image. In such an embodiment, subsequent rebuilding of the software image may result in a software image that excludes any added security packages.

At S760, an alert is generated. The alert may indicate the identified cybersecurity threats, which software image recipes were updated, any software images which were rebuilt, a combination thereof, and the like.

Figure 8:
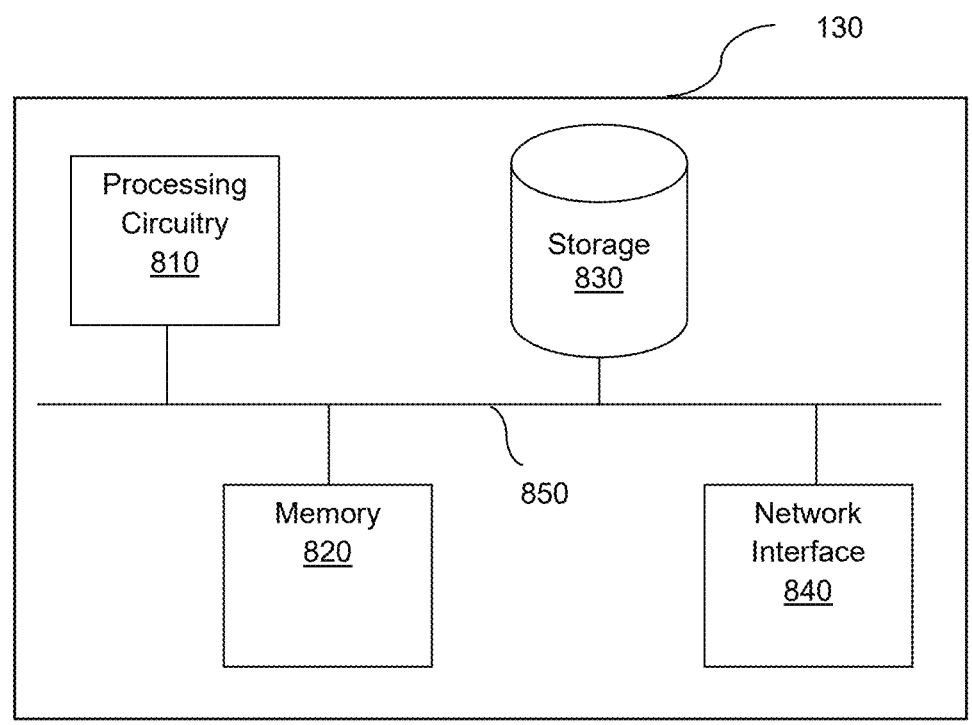
FIG. 8 is a schematic diagram of an image manager according to an embodiment.

FIG. 8 is an example schematic diagram of an image manager 111 according to an embodiment. The image manager 111 includes a processing circuitry 810 coupled to a memory 820, a storage 830, and a network interface 840. In an embodiment, the components of the image manager 111 may be communicatively connected via a bus 850.

The processing circuitry 810 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

In at least some embodiments, the processing circuitry 810 is configured to execute generative artificial intelligence (genAI) models, perform inference using or otherwise apply genAI models, train genAI models, fine-tune genAI models, combinations thereof, and the like. Such genAI models are configured to produce text, images, videos, or other forms of data, and may include, but are not limited to, language models (for example, but not limited to, large language models, small language models, etc.), text-to-image artificial intelligence (AI) image generation systems, text-to-video AI video generators, combinations thereof, and the like. To this end, the processing circuitry 810 may be adapted to realize a transformer deep learning architecture (e.g., a generative pre-trained transformer [GPT], bidirectional encoder representations from transformers [BERT], text-to-text transfer transformer [T5], etc.), a diffusion model, both, and the like.

In accordance with various such embodiments, the hardware utilized for the processing circuitry 810 is selected in order to enable genAI functionality based on factors such as, but not limited to, parallelism (e.g., amounts of parallel processing to be performed), memory demands (e.g., amounts of random access memory [RAM] utilized to store model weights and training during processing or video RAM [VRAM] to support large language models), clock speeds, thread counts, storage (for example, to support certain amounts of storage or storage speeds), cooling (e.g., liquid cooling or air cooling systems), power supply (e.g., in order to enable a target wattage used for certain kinds of activities), networking and connectivity (e.g., in order to support seamless data transfer for deployments involving communications between or among multiple machines or clusters), combinations thereof, and the like.

In embodiments which utilize large language models (LLMs) or otherwise perform operations which may require or be enhanced through use of parallel processing, the processing circuitry 810 may include one or more GPUs or other processing units suitable for parallel processing. Such GPUs may be configured to perform matrix multiplication operations including, but not limited to, performing dot product operations in order to support neural network operations (for example, by performing dot product operations for hidden layer computations) or performing dot product operations in an attention mechanism in order to compute a similarity score between vectors for use in computing attention weights. In at least some such embodiments using GPUs, the processing circuitry 810 may include a number of CPU cores which is equal to or greater than the number of GPUs in order to facilitate or otherwise support parallel processing via multiple GPUs.

The memory 820 may be volatile (e.g., random access memory, etc.), non-volatile (e.g., read only memory, flash memory, etc.), or a combination thereof.

In one configuration, software for implementing one or more embodiments disclosed herein may be stored in the storage 830. In another configuration, the memory 820 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 810, cause the processing circuitry 810 to perform the various processes described herein.

The storage 830 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 840 allows the image manager 111 to communicate with other systems, devices, components, applications, or other hardware or software components, for example as described herein.

It should be understood that the embodiments described herein are not limited to the specific architecture illustrated in FIG. 8, and other architectures may be equally used without departing from the scope of the disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various embodiments disclosed herein can be implemented as hardware, firmware, software, or any combination thereof. Moreover, the software may be implemented as an application program tangibly embodied on a program storage unit or computer-readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer-readable medium is any computer-readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for software image management, comprising:
generating a plurality of software packages including a plurality of units of code, wherein each software package of the plurality of software packages is generated using a respective unit of code of the plurality of units of code, wherein the plurality of software packages includes a first security package, wherein the respective unit of code for the security package configures a processing circuitry to perform at least one cybersecurity function when executed by the processing circuitry; and
building a software image based on the plurality of software packages by executing a set of instructions of a file, wherein the set of instructions causes the plurality of software packages to be combined in order to build the software image when executed, wherein the software image is executed to deploy a software component in a computing environment;
ingesting cybersecurity data from the computing environment in which the software component is deployed;
identifying a cybersecurity threat based on the ingested cybersecurity data, wherein the cybersecurity threat is identified with respect to at least one threat vector; and
rebuilding the software image, wherein rebuilding the software image includes adding a second security package, wherein the second security package is designed to secure the software image against the cybersecurity threat, wherein the second security package is further designed to secure the software image against the at least one threat vector.

2. The method of claim 1, further comprising:
rebuilding the software image using an updated version of at least one unit of code of the plurality of units of code.

3. The method of claim 2, further comprising:
monitoring for changes to the plurality of units of code; and
identifying an update based on the monitoring, wherein the update includes a change in the at least one unit of code, wherein the updated version of the at least one unit of code is based on the update.

4. The method of claim 2, further comprising:
identifying a type of cybersecurity threat with respect to the software image, wherein the updated version of the at least one unit of code used to rebuild the software image is secured against the type of cybersecurity threat.

5. The method of claim 1, further comprising:
generating the file using a generative artificial intelligence (genAI) model by prompting the genAI model using a prompt including text identifying the plurality of packages.

6. The method of claim 5, further comprising:
providing the genAI model access to at least one tool by prompting the genAI model using a prompt including text describing how to use the at least one tool, wherein the genAI model access the at least one tool in order to obtain the plurality of units of code.

7. The method of claim 1, further comprising:
executing the software image in order to cause deployment of a software component in a computing environment.

8. A non-transitory computer-readable medium having stored thereon instructions for causing a processing circuitry to execute a process, the process comprising:
generating a plurality of software packages including a plurality of units of code, wherein each software package of the plurality of software packages is generated using a respective unit of code of the plurality of units of code, wherein the plurality of software packages includes a first security package, wherein the respective unit of code for the security package configures a processing circuitry to perform at least one cybersecurity function when executed by the processing circuitry; and
building a software image based on the plurality of software packages by executing a set of instructions of a file, wherein the set of instructions causes the plurality of software packages to be combined in order to build the software image when executed, wherein the software image is executed to deploy a software component in a computing environment;
ingesting cybersecurity data from the computing environment in which the software component is deployed;
identifying a cybersecurity threat based on the ingested cybersecurity data, wherein the cybersecurity threat is identified with respect to at least one threat vector; and
rebuilding the software image, wherein rebuilding the software image includes adding a second security package, wherein the second security package is designed to secure the software image against the cybersecurity threat, wherein the second security package is further designed to secure the software image against the at least one threat vector.

9. A system for software image management, comprising:
a processing circuitry; and
a memory, the memory containing instructions that, when executed by the processing circuitry, configure the system to:
generate a plurality of software packages including a plurality of units of code, wherein each software package of the plurality of software packages is generated using a respective unit of code of the plurality of units of code, wherein the plurality of software packages includes a first security package, wherein the respective unit of code for the security package configures a processing circuitry to perform at least one cybersecurity function when executed by the processing circuitry; and
build a software image based on the plurality of software packages by executing a set of instructions of a file, wherein the set of instructions causes the plurality of software packages to be combined in order to build the software image when executed, wherein the software image is executed to deploy a software component in a computing environment;

ingest cybersecurity data from the computing environment in which the software component is deployed;
identify a cybersecurity threat based on the ingested cybersecurity data, wherein the cybersecurity threat is identified with respect to at least one threat vector; and
rebuild the software image, wherein rebuilding the software image includes adding a second security package, wherein the second security package is designed to secure the software image against the cybersecurity threat, wherein the second security package is further designed to secure the software image against the at least one threat vector.

10. The system of claim 9, wherein the system is further configured to:
rebuild the software image using an updated version of at least one unit of code of the plurality of units of code.

11. The system of claim 10, wherein the system is further configured to:
monitor for changes to the plurality of units of code; and
identify an update based on the monitoring, wherein the update includes a change in the at least one unit of code, wherein the updated version of the at least one unit of code is based on the update.

12. The system of claim 10, wherein the system is further configured to:
identify a type of cybersecurity threat with respect to the software image, wherein the updated version of the at least one unit of code used to rebuild the software image is secured against the type of cybersecurity threat.

13. The system of claim 9, wherein the system is further configured to:
generate the file using a generative artificial intelligence (genAI) model by prompting the genAI model using a prompt including text identifying the plurality of packages.

14. The system of claim 13, wherein the system is further configured to:
provide the genAI model access to at least one tool by prompting the genAI model using a prompt including text describing how to use the at least one tool, wherein the genAI model access the at least one tool in order to obtain the plurality of units of code.

15. The system of claim 9, wherein the system is further configured to:
execute the software image in order to cause deployment of a software component in a computing environment.

* * * * *